US010520211B1

(12) United States Patent
Sclafani

(10) Patent No.: US 10,520,211 B1
(45) Date of Patent: Dec. 31, 2019

(54) THERMOSTAT BASED CONTROL SYSTEM AND METHOD FOR USE WITH WATER-COOLED AIR CONDITIONING UNIT TO EFFECT AUTOMATIC RESET OF REFRIGERANT PRESSURE SWITCHES

(71) Applicant: Joe Sclafani, Fort Lauderdale, FL (US)

(72) Inventor: Joe Sclafani, Fort Lauderdale, FL (US)

( * ) Notice: Subject to any disclaimer, the term of this patent is extended or adjusted under 35 U.S.C. 154(b) by 142 days.

(21) Appl. No.: 15/945,219

(22) Filed: Apr. 4, 2018

Related U.S. Application Data

(63) Continuation-in-part of application No. 14/285,889, filed on May 23, 2014, now abandoned.

(60) Provisional application No. 61/827,031, filed on May 24, 2013.

(51) Int. Cl.
| | |
|---|---|
| *F24F 11/30* | (2018.01) |
| *F24F 11/52* | (2018.01) |
| *F24F 11/61* | (2018.01) |
| *F24F 11/64* | (2018.01) |
| *G05B 19/042* | (2006.01) |
| *F24F 11/65* | (2018.01) |
| *F24F 120/10* | (2018.01) |

(52) U.S. Cl.
CPC .............. *F24F 11/30* (2018.01); *F24F 11/52* (2018.01); *F24F 11/61* (2018.01); *F24F 11/64* (2018.01); *F24F 11/65* (2018.01); *G05B 19/042* (2013.01); *F24F 2120/10* (2018.01); *F25B 2339/047* (2013.01); *G05B 2219/25252* (2013.01); *G05B 2219/2614* (2013.01)

(58) Field of Classification Search
CPC ....................... F24F 11/0009; F24F 2011/0043
See application file for complete search history.

(56) References Cited

U.S. PATENT DOCUMENTS

| | | | |
|---|---|---|---|
| 3,102,677 A * | 9/1963 | Evans | ................... F25B 49/025 417/14 |
| 3,620,037 A | 11/1971 | Young | |
| 4,990,057 A | 2/1991 | Rollins | |

(Continued)

OTHER PUBLICATIONS

TX9100U Installation and Operating Instructions [online]. Lux Products Corporations, 2011 [retrieved Oct. 5, 2016] Retrieved from the internet: <URL:http://luxproducts.com/IMG/pdf/tx9100u_manual_en.pdf> (Year: 2011).*

*Primary Examiner* — Robert E Fennema
*Assistant Examiner* — Shon G Foley
(74) *Attorney, Agent, or Firm* — Mark D. Bowen; Malin Haley DiMaggio & Bowen, P.A.

(57) ABSTRACT

A thermostat based control system and method for achieving automatic, periodic reset of refrigerant high and low pressure switches, tripped by temporary condenser water flow interruption, to avoid high humidity issues stemming from prolonged shut-down of water-cooled air conditioning systems in seasonally occupied residential units by automatically and periodically raising the set point temperature to a higher temperature setting for a predetermined period of time whereafter the temperature setting is returned to the user-selected set point temperature. Raising the set point temperature to said higher temperature setting causes said thermostat to terminate a cooling demand signal such that time is provided to allow for a pressure switch associated with the water-cooled air conditioning unit to automatically reset.

3 Claims, 2 Drawing Sheets

(56) References Cited

U.S. PATENT DOCUMENTS

| | | | |
|---|---|---|---|
| 5,000,382 A * | 3/1991 | Stedman | G05D 23/1904 236/46 R |
| 6,615,594 B2 | 9/2003 | Jayanth et al. | |
| 6,758,050 B2 | 7/2004 | Jayanth et al. | |
| 6,814,299 B1 | 11/2004 | Carey | |
| 2006/0130496 A1 | 6/2006 | Chapman et al. | |
| 2013/0345882 A1 * | 12/2013 | Dushane | G05B 15/02 700/276 |

* cited by examiner

THERMOSTAT BASED CONTROL SYSTEM AND METHOD FOR USE WITH WATER-COOLED AIR CONDITIONING UNIT TO EFFECT AUTOMATIC RESET OF REFRIGERANT PRESSURE SWITCHES

CROSS REFERENCE TO RELATED APPLICATIONS

This application is a continuation-in-part of application Ser. No. 14/285,889, filed on May 23, 2014, which claims the benefit of provisional U.S. Patent Application Ser. No. 61/827,031, filed on May 24, 2013.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all rights whatsoever.

BACKGROUND OF THE INVENTION

1. Field of the Invention

The present invention generally relates thermostat control of air conditioning systems, and more particularly to a thermostat control based system and method for effecting automatic, periodic reset of refrigerant high and low-pressure switches to avoid high humidity issues stemming from prolonged shut-down of water-cooled air conditioning systems in seasonally occupied residential units resulting from temporary condenser water flow interruption.

2. Description of Related Art

Air conditioning is the process of altering the properties of air, primarily temperature and humidity, to more favorable conditions. Air conditioning systems rely on the vapor compression refrigeration cycle to alter the air temperature and humidity with a conditioned space. Modern air conditioning systems include a compressor to compress refrigerant vapor, a condenser which rejects heat to a heat sink to condense the compressed refrigerant to liquid, and a forced air evaporator wherein air flow across the evaporator coil is cooled by expansion of the liquid refrigerant back to a vapor phase. Air conditioning system condensers are typically cooled by either air ("air-cooled system") or water ("water-cooled system or water-source system"). A thermostat mounted within the conditioned space energizes the system to maintain a user desired temperature, commonly referred to as the set point. The thermostat maintains the system energized (e.g. "on") until the sensed temperature of the conditioned space is brought to the set point.

In warm climates, air conditioning is essential to maintain a comfortable environment by controlling both temperature and humidity. If an air conditioner fails during the warm periods, the temperature as well as the humidity within the conditioned space will climb. When the space is occupied, the occupants will typically call an air conditioning company to send a technician to trouble shoot and repair the system. When the space is unoccupied, however, a failure of the air conditioning system can go unnoticed for extended periods of time thereby exposing the space, such as a home, apartment, or condominium, to high temperatures and high humidity. If left unchecked, such conditions will result in the growth of mold and mildew that can cause significant damage to the space, the furnishings, and articles of personal property.

Many residences are typically only occupied for certain times of the year. For example, people often have second homes or condominiums which they occupy only during certain months of the year. In Florida, so called "snowbirds" are seasonal residents from colder climates who spend a portion of the winter in Florida's warmer climate. When the weather gets warm, the seasonal residents leave their Florida residences unoccupied for months at a time. Many seasonal residents live in high-rise condominiums equipped with water-cooled air conditioning units. Those buildings typically having a common cooling water system that supplies the condenser section of each unit with water to cause refrigerant to condense into its liquid state. Water exiting the condenser(s) is typically pumped to a roof mounted heat transfer apparatus, such as a cooling tower, where heat is rejected to the atmosphere.

Central condenser cooling water systems, however, require maintenance and/or experience other problems that often result in an interruption of water flow. When the condenser cooling water flow to a water-cooled air conditioning system is interrupted, the refrigerant pressure will increase causing actuation of compressor protection devices, such a pressure switches (e.g. high-pressure switch) or compressor motor temperature switches, to shut the air conditioning unit down. More particularly, air conditioning systems are provided with pressure sensitive cut-off switches, typically high and low-pressure switches, that cut power to the system when abnormally high or low refrigerant pressures are detected. With the unit off, the thermostat will continue to call for cooling as the temperature and humidity in the conditioned space continue to rise above the cooling setpoint. The pressure switches typically require an interruption of the thermostat's call for cooling in order to reset. A tripped pressure switch on a unit serving an unoccupied space in a warm climate may allow the temperature within the conditioned space to remain above the thermostat set point for days or weeks. As a result, seasonal unit owners are often required to pay maintenance personnel to enter their unoccupied units upon restoration of cooling water flow and interrupt the thermostat's call for cooling (by either turning the cooling mode "off" and then back "on" or by manually raising then lowering the setpoint) in order to allow the pressure switch to reset so that the system may resume cooling. If the thermostat's call for cooling is not interrupted, the pressure switch will not reset and the air conditioning unit will remain off indefinitely whereby high temperature and humidity conditions result in the growth of mold.

Accordingly, there exists a need for a thermostat control based system and method for effecting automatic, periodic reset of particularly the refrigerant high-pressure switch to avoid high humidity issues stemming from prolonged shut-down of water-cooled air conditioning systems in seasonally occupied residential units resulting from temporary condenser water flow interruption.

BRIEF SUMMARY OF THE INVENTION

The present invention overcomes the limitations and disadvantages present in the art by providing a thermostat based control system and method for achieving automatic, periodic reset of refrigerant pressure switches, actuated by temporary condenser water flow interruption, to avoid high humidity issues stemming from prolonged shut-down of water-cooled air conditioning systems in seasonally occupied residential units. In accordance with a preferred embodiment a thermostat is provided for control of an air conditioning unit. The thermostat includes electronic circuitry including a factory embedded program function that automatically and periodically adjusts the cooling temperature set point to a maximum setting, that is higher than the actual temperature within the conditioned space, by overriding any active or user programmed set point, so as to terminate the thermostat's demand for cooling thereby allowing the tripped high pressure switch to reset whereby the air conditioning unit is capable of resuming operation upon a subsequent call for cooling. The thermostat preferably includes a pair of manually actuated one-touch temperature profile buttons including a "home-mode" button and an "away-mode" button. Actuation of the "away-mode" button configures the thermostat to activate the factory embedded control logic/software to periodically override user selected or programmed set points by automatically and temporarily upwardly adjust the set point to a maximum thermostat set point value for a predetermined period of time so as to terminate the thermostat's call for cooling thereby allowing any tripped pressure switch to reset. Thus by selecting the "Away Mode" the set point temperature is upwardly adjusted to a maximum setting, preferably once every 24 hours, for a predetermined of time (e.g. 15 minutes) such that the thermostat ceases a call for cooling, after which the factory installed program then automatically returned to its previous setting for normal operation. The present invention thus provides a thermostat that is particularly suitable for use with water-cooled air conditioning systems in multi-unit buildings occupied by a significant number of seasonal residents to maintain temperature and humidity conditions within the conditioned space by using automatic and periodic set point adjustment to allow the system to re-set after an interruption of condenser water flow.

Accordingly, it is an object of the present invention to provide advancements in the field of air conditioning systems.

Another object of the present invention is to provide advancements in thermostat control of water-cooled air conditioning systems.

Yet another object of the present invention is to provide a thermostat architecture that uses an embedded factory override that automatically re-sets the cooling set point temperature to periodically terminate the thermostat's call for cooling thereby allowing tripped refrigerant pressure switches to re-set.

In accordance with these and other objects, which will become apparent hereinafter, the instant invention will now be described with particular reference to the accompanying drawings.

BRIEF DESCRIPTION OF THE SEVERAL VIEWS OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

Unless otherwise defined, all technical and scientific terms used herein have the same meaning as commonly understood by one of ordinary skill in the art to which this invention pertains. In the case of conflict, the present document, including definitions will control. As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated. As used herein, when a number or a range is recited, ordinary skill in the art understand it intends to encompass an appropriate, reasonable range for the particular field related to the invention.

Figure 1:
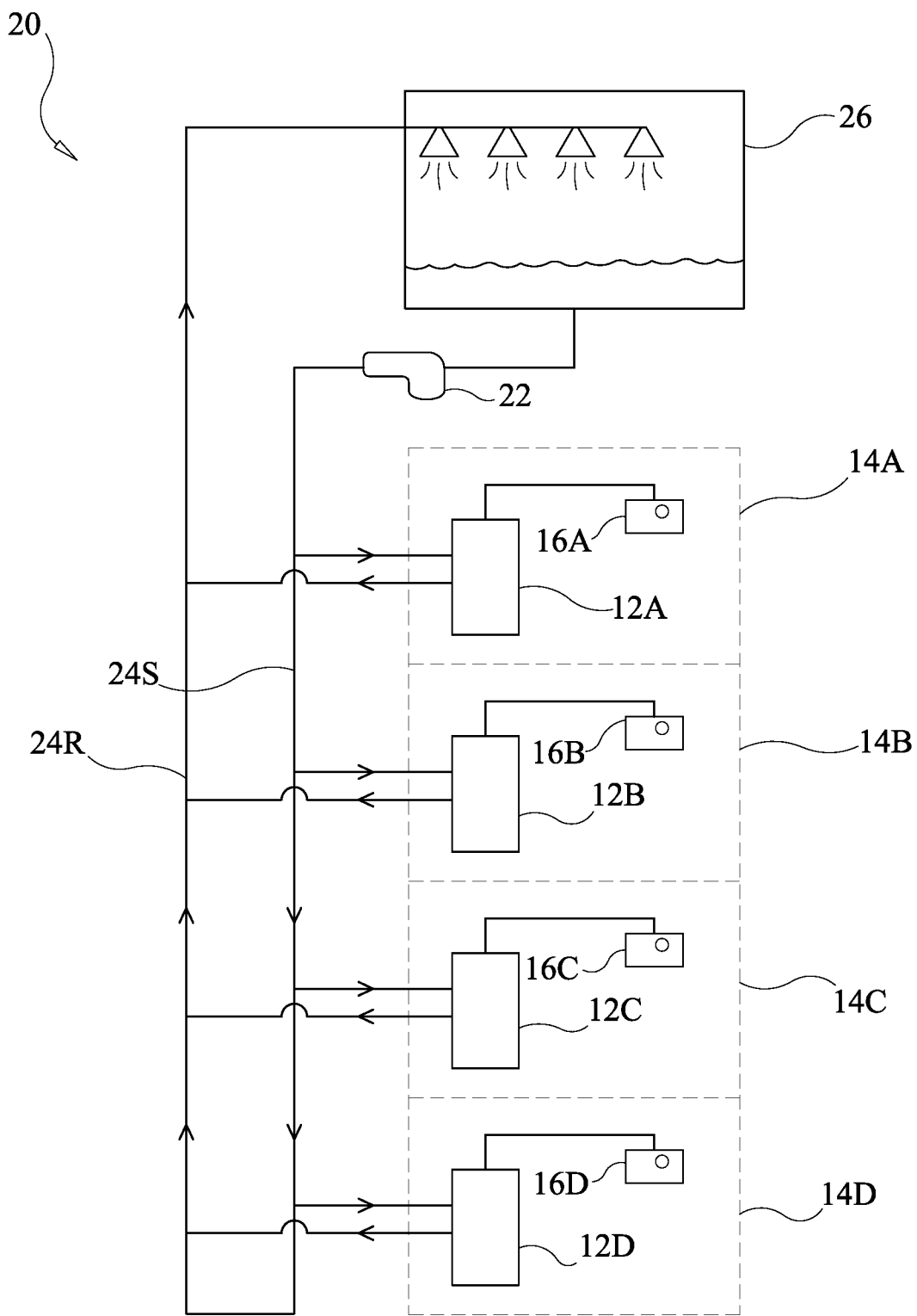
FIG. 1 is a schematic illustration of a water-cooled air conditioning system for a multi-unit building.

Turning now to the drawings a thermostat based control system and method for achieving automatic, periodic reset of a refrigerant pressure switch, which has been triggered/actuated by temporary interruption of condenser water flow, to avoid high humidity issues stemming from prolonged shut-down of water-cooled air conditioning systems in seasonally occupied residential units. FIG. 1 is a schematic illustration of a water-cooled air conditioning system, generally referenced as 10, of the type commonly found in multi-story, multi-unit residential structures, namely high-rise condominiums and apartments. Air conditioning system 10 includes a plurality of water-cooled packaged air conditioning units, referenced as 12A, 12B, 12C, and 12D, each of which is dedicated to providing comfort cooling/heating to a conditioned space, referenced as 14A, 14B, 14C, and 14D. Each air conditioning unit 12A-D, is controlled by a thermostat, referenced as 16A, 16B, 16C, and 16D. FIG. 1 further illustrates cooling water system, generally referenced as 20, that provides condenser water flow to each air conditioning unit 12. Cooling water system includes a pump 22, a water pipe circuit, including condenser supply and return lines, referenced as 24S and 24R respectively, feeding cooling water to each air conditioning unit, and a cooling tower 26 (or other heat transfer apparatus) for rejecting heat to the atmosphere. As discussed above, any interruption of condenser water flow, such as a pump failure or routine cooling tower maintenance, can result in high refrigerant pressures that will result in the air conditioning unit's high-pressure switch to trip thereby deactivating the unit by preventing compressor operation. When this happens, the temperature within the conditioned space 12 can rise above the thermostat set point (e.g. 78° F.) whereby the thermostat is continuously sensing a cooling demand and thus continuously transmitting a call to the unit for cooling. In order to reactivate the compressor, the system needs to be reset by either terminating the call for cooling or at the disconnect switch.

Figure 2:
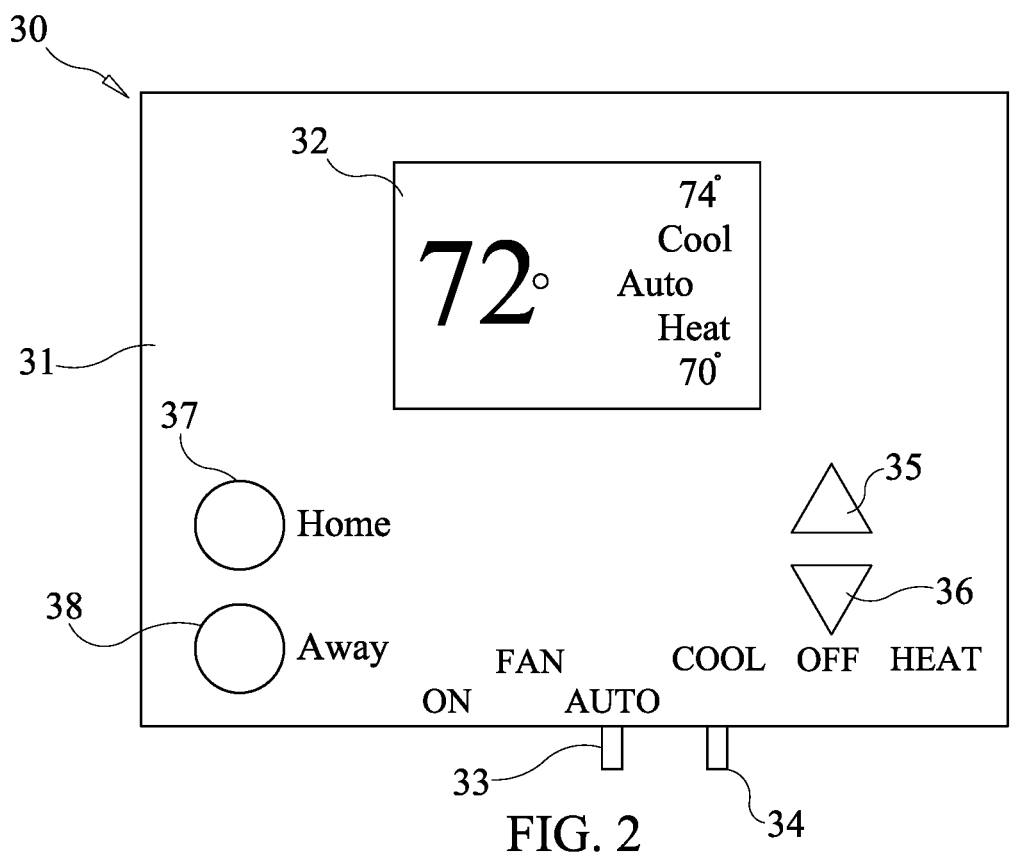
FIG. 2 depicts a thermostat adapted with "Home" and "Away" set point program buttons in accordance with the present invention.

FIG. 2 illustrates a thermostat 30 in accordance with the present invention. Thermostat 30 includes a housing 31, an electronic display 32, a fan control switch 33, a system mode control switch 34, set point raising and lowering buttons, referenced as 35 and 36 respectively, and first and second mode buttons, representing a "Home Mode" and an "Away Mode", said buttons referenced as 37 and 38 respectively. Electronic display 32 functions to display the temperature 32A of the conditioned space, heating set point 32B, cooling set point 32C, and fan mode 32D. Fan control switch comprises a manually actuated two-position switch for allowing the user to selectively place fan operation in either "ON" or "AUTO" modes as is known in the air conditioning control and thermostat art. System mode control switch 34 comprises a manually actuated three-position switch for allowing the user to place the system in 1 of 3 modes, namely "Cooling mode", "Heating mode", or "Off". Set point buttons 35 and 36 function to allow the user to raise and lower the set point. As should be apparent, thermostat 30 further includes a microprocessor and control software that controls operation of the thermostat based on the settings of the various control switches and buttons. While the present invention depicts a preferred embodiment of a thermostat in FIG. 2, it should be apparent that the thermostat control scheme set forth herein may be used with any electronic thermostat by simply adapting the programming thereof.

A significant aspect of the present invention involves providing thermostat 30 with the "Home Mode" and "Away Mode" Buttons, referenced as 37 and 38 respectively. Actuation of buttons 37 and 38 are mutually exclusive meaning the user can only be in one mode at any given time. In the alternative, the "Away Mode" button may be toggled "on" or "off". When configured in the Home Mode, thermostat 30 functions generally conventionally by maintaining a constant level set point as input by the user, typically the occupant of the conditioned space. The set point may be manually entered as a fixed set point, or may be controlled by user programmed schedule. When, however, thermostat 30 is configured in the Away Mode the factory embedded control logic/software causes the thermostat override any user setpoint setting or setpoint schedule by automatically raising the user selected set point to an elevated setting, preferably the maximum allowed temperature setting, for a predetermined period of time, preferably about 15 minutes, after which the set point is returned to the original user selected set point setting. The control operation of automatically temporarily raising the cooling set point for a predetermined period of time then returning the set point to its original setting is referred to as a factory embedded control logic. The factory embedded control logic automatically overrides any user entered set point or programmed set point schedule by periodically raising the set point to a maximum setting and returning the set point to the user entered or programmed set point after a predetermined (e.g. 15 minute) period of time when the thermostat is configured in the "Away Mode". A significant advantage is provided by using a factory embedded maximum set-back and return mode by eliminating the need for complex user programming and accomplishes actuation of the mode by a single button. In addition, since the set point temperature is only periodically maintained at the maximum setting for a limited predetermined period of time (approximately 15 minutes) humidity levels within the conditioned space are not significantly affected during normal operation of the air conditioning unit. By temporarily elevating the set point above the temperature of the conditioned space, the thermostat will no longer sense a demand for cooling (e.g. cooling set point is higher than sensed temperature of the conditioned space) and thus will terminate the call for cooling thereby de-energizing the air conditioning system. In doing so, the high-pressure safety switch, if tripped due to condenser water flow interruption, is allowed to automatically reset. With the high-pressure switch reset, the air conditioning system will resume normal operation (assuming water flow through the condenser has resumed) thereby cooling and dehumidifying the space without requiring human activity to reset when the set point returns to normal (e.g. 75-degrees) such that the thermostat generates a cooling demand signal. In a preferred embodiment, the automatic set-back mode occurs at least once per 24-hour period, and preferably multiple times per day, namely 6 times per day (e.g. every 4.0 hours).

Figure 3:
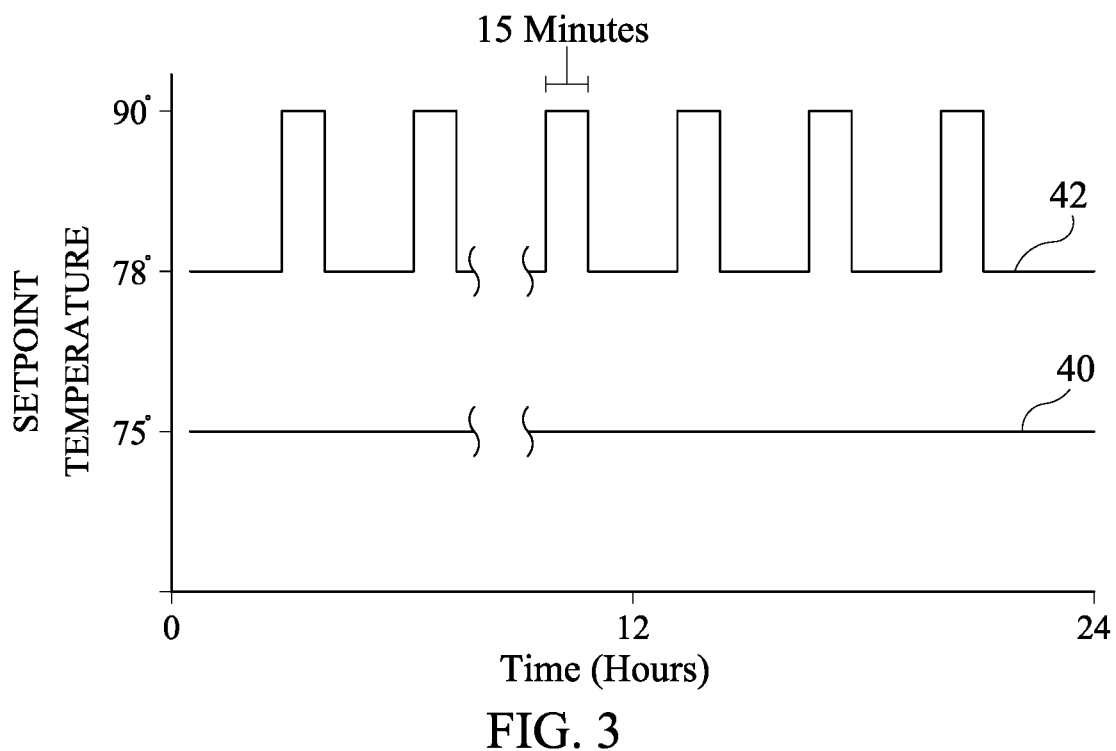
FIG. 3 is a graphic illustration depicting automatic set point adjustment when the thermostat is configured in the "Away" mode.

FIG. 3 provides a line-graph illustration of the set points in both the Home Mode and the Away Mode. The graph depicted in FIG. 3 is configured with the thermostat set point shown on the vertical axis and Time running along the horizontal axis. Reference number 40 illustrates the thermostat maintaining the user selected set point of 75-degrees constant over the 24-hour period as if the thermostat were configured for Home Mode operation. Thus, in the Home Mode thermostat 30 generally functions as a conventional thermostat. Reference number 42 illustrates set point control when thermostat 30 is configured in the Away Mode, set to maintain a setting of 78-degrees, and presents a significant departure from prior art thermostat control schemes. More particularly, when configured in the Away Mode, factory embedded control software causes thermostat 30 to automatically and periodically (typically at least once a day and preferably six times per day) raises the user selected set point (e.g. 78-degrees) to a higher, preferably maximum value (e.g. 90-degrees) for a predetermined period of time (e.g. 15 minutes). As should be apparent, the critical aspect of the predetermined period of time is a period of time sufficient for the high-pressure switch (or other compressor protection switch) to automatically reset. Once the temperature is raised, the thermostat senses a room temperature that is less than the raised set point and thus terminates the call for cooling which functions in accordance with the air conditioning units existing control architecture to allow the high-pressure switch to re-set. Thus, assuming that cooling water flow has resumed since the interruption, the air conditioning unit will resume normal operation when the thermostat automatically returns the set point to the user selected Away Mode setting (e.g. 78-degrees). The present invention thus provides a thermostat that is particularly suitable for use with water-cooled air conditioning systems in multi-unit buildings occupied by a significant number of seasonal residents to maintain temperature and humidity conditions within the conditioned space by using automatic and periodic set point adjustment to allow the system to re-set after an interruption of condenser water flow whereby human effort to manually reset the system is eliminated. While the above-referenced description calls for raising the set point to a "maximum" setting when in the Away Mode, raising the set point to less than the maximum setting is contemplated as thus falls within the scope of the present invention.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. An electronic thermostat having a microprocessor and control software that enable the thermostat to control the operation of a water-cooled air conditioning unit based on a user-selected set point temperature, wherein the improvement comprises providing first and second mode buttons, said first mode button configures said control software to maintain a user-selected set point, and said second mode button configures said control software to an Away Mode wherein factory embedded control logic overrides any user selected set point to automatically and repeatedly raise the set point to a higher temperature setting for a predetermined period of time and thereafter return the set point back to the user-selected set point upon expiration of said predetermined period of time while the thermostat is set to said Away mode, whereby raising said set point temperature to said higher temperature setting causes said thermostat to terminate a cooling demand signal such that a predetermined period of time is provided which enables the pressure switch associated with the water-cooled air conditioning unit to automatically reset, wherein said predetermined period of time is at least 10 minutes, and wherein said set point is periodically raised at least once every 4 to 24 hours when in said Away Mode.

2. An electronic thermostat configured to control the operation of a water-cooled aft conditioning unit based on a user selected set point temperature, said electronic thermostat including:
   first and second mode buttons;
   wherein activation of said first mode button causes the thermostat to operate in a Home Mode wherein the user selected set point temperature is maintained based solely on user input; and
   wherein activation of said second mode button causes the thermostat to enter an Away Mode wherein factory embedded control logic overrides any user selected set point setting by periodically raising the set point to a higher temperature for a predetermined period of time whereafter the set point k returned to the user-selected set point setting while in said Away mode, whereby raising said set point temperature to said higher temperature setting causes said thermostat to terminate a cooling demand signal such that a predetermined period of time is provided which enables the pressure switch associated with the water-cooled air conditioning unit to automatically reset, wherein said predetermined period of time is at least 10 minutes, and wherein said set point is periodically raised at least once every 4 to 24 hours when in said Away Mode.

3. An electronic thermostat configured to control the operation of a water-cooled air conditioning unit based on a user selected set point temperature, said electronic thermostat including;
   a housing,
   an electronic display for displaying room temperature, at least one set point temperature, and operating mode information;
   a fan control switch, a system mode control switch having three mode settings including a Cooling Mode setting, a Heating Mode setting, and an Off setting;
   a set point raising button and a set point lowering button; and
   first and second mode buttons;
   wherein activation of said first mode button causes the thermostat to operate in a Home Mode wherein the user-selected set point temperature is maintained constant; and
   wherein activation of said second mode button causes the thermostat operate in an Away Mode wherein factory embedded control logic overrides any user selected set point setting by periodically raising the set point to a higher temperature for a predetermined period of time whereafter the set point is returned to the user-selected set point setting while in said Away mode, whereby raising said set point temperature to said higher temperature setting causes said thermostat to terminate a cooling demand signal such that a predetermined period of time is provided which enables the pressure switch associated with the water-cooled air conditioning unit to automatically reset, wherein said predetermined period of time is at least 10 minutes, and wherein said set point is periodically raised at least once every 4 to 24 hours when in said Away Mode.

* * * * *